(12) United States Patent
Dudarev et al.

(10) Patent No.: US 9,756,492 B1
(45) Date of Patent: Sep. 5, 2017

(54) SIMULTANEOUS MESSAGING SYSTEM AND METHOD

(71) Applicant: INSURANCE SUPERMARKET INC., Woodbridge (CA)

(72) Inventors: Alex Dudarev, Woodbridge (CA); Charles Nastaskin, Woodbridge (CA); Daniel Sazonov, Woodbridge (CA)

(73) Assignee: Insurance Supermarket Inc., Woodbridge (CA)

( * ) Notice: Subject to any disclaimer, the term of this patent is extended or adjusted under 35 U.S.C. 154(b) by 0 days.

(21) Appl. No.: 15/182,029

(22) Filed: Jun. 14, 2016

(51) Int. Cl.
*H04W 4/20* (2009.01)
*H04W 76/02* (2009.01)
*H04W 4/02* (2009.01)

(52) U.S. Cl.
CPC ........... *H04W 4/206* (2013.01); *H04W 4/023* (2013.01); *H04W 76/02* (2013.01)

(58) Field of Classification Search
CPC ...... H04W 4/206; H04W 76/02; H04W 4/023
USPC .. 455/412.1–412.2, 414.1–414.2, 456.1–457
See application file for complete search history.

(56) References Cited

U.S. PATENT DOCUMENTS

| | | | | |
|---|---|---|---|---|
| 7,260,603 | B1* | 8/2007 | Masciantonio | G06Q 30/02 707/999.01 |
| 2005/0101335 | A1* | 5/2005 | Kelly | G06Q 10/109 455/456.3 |
| 2013/0297329 | A1* | 11/2013 | Banthia | G06Q 50/22 705/2 |
| 2014/0244275 | A1* | 8/2014 | Parthasarathy | G06Q 50/22 705/2 |
| 2016/0277869 | A1* | 9/2016 | Mulayev | H04W 4/20 |
| 2016/0335694 | A1* | 11/2016 | Catino | G06F 17/30241 |
| 2016/0379173 | A1* | 12/2016 | Karnati | G06Q 10/1095 705/7.19 |

* cited by examiner

*Primary Examiner* — Michael Mapa
(74) *Attorney, Agent, or Firm* — Bereskin & Parr LLP/S.E.N.C.R.L., s.r.l.; Isis E. Caulder

(57) ABSTRACT

At least one of the embodiments described herein relate generally to a method of communicating an engagement to a plurality of active mobile devices, wherein each active mobile device is associated with an active user. The method may include providing at least one communication socket to each of the active mobile devices; receiving location data from those devices, information related to an engagement. In response to determining the location of the engagement, a first notification is provided to nearby active mobile devices to determine the corresponding active user's availability. In response to confirming the engagement, a second notification is sent to the nearby active mobile devices to confirm the corresponding active user's availability. An active user is selected among the confirmed available active users and a third notification is provided with the selection result.

25 Claims, 10 Drawing Sheets

SIMULTANEOUS MESSAGING SYSTEM AND METHOD

FIELD

The embodiments described herein relate to systems and methods related to distributing notifications and in particular to a plurality of recipients.

INTRODUCTION

Generally, consumers that desire certain products and services may seek out vendors or information through a number of sources including word of mouth, printed advertising via publications such as the YellowPages™ or newspaper classifieds, and the Internet. In general, a significant amount of time may pass between the consumer's initial research and the consumer obtaining the product or service. A portion of this delay may be the result of the consumer spending too much time researching due to lack of knowledge, the inability to identify a suitable product or service as a result of too many choices, or delays associated with finding someone knowledgeable for assistance (e.g. the person with knowledge is not available due to scheduling issues). Therefore, it is desirable to reduce this delay so as to enable consumers to quickly obtain information or products they desire, and for service providers and merchants to have a way to quickly identify consumers who desire their specific products and services so as to help increase the likelihood of a successful sale.

SUMMARY

The embodiments described herein provide in one aspect, a method of communicating an engagement to a plurality of active mobile devices, wherein each active mobile device is associated with an active user, the method comprising providing at least one data communication socket for each active mobile device in the plurality of active mobile devices; receiving a plurality of location data streams, wherein each location data stream comprises location data corresponding to a physical location of each active mobile device in the plurality of active mobile devices, and wherein the location data is communicated via a first data communication socket in the at least one data communication socket; and receiving information corresponding to the engagement, the information containing at least an engagement location.

The method further comprises in response to determining the engagement location i) identifying at least one nearby active mobile device, wherein the identifying comprises evaluating the physical location of each active mobile device in the plurality of active mobile devices relative to the engagement location; ii) providing a first notification regarding the engagement to each of the at least one nearby active mobile device; and iii) receiving a plurality of first responses responding to the first notification from each of the at least one nearby active mobile device, wherein the first response is communicated via a second data communication socket in the at least one data communication socket.

The method further comprises in response to determining that the engagement has been confirmed i) providing a second notification to each of the at least one nearby active device regarding the confirmed engagement; and ii) receiving a plurality of second responses responding to the second notification from each of the at least one nearby active mobile device, wherein the second response is communicated via the second communication socket in the at least one data communication socket; selecting a selected active user to participate in the confirmed engagement, wherein the selected active user is associated with a selected nearby active mobile device in the at least one nearby active mobile device; and providing a third notification to the selected nearby active mobile device and the at least one nearby active mobile device that is not the selected nearby active mobile device regarding the selection result.

The embodiments described herein provide in another aspect, a device for communicating an engagement to a plurality of active mobile devices, wherein each active mobile device is associated with an active user, the system comprising: a communication interface; a non-transitory memory; at least one computer processor, wherein the at least one computer processor is configured to execute instructions stored on the non-transitory memory to: establish, at the communication interface, at least one data communication socket for each active mobile device in the plurality of active mobile devices; receive, at the communication interface, a plurality of location data streams, wherein each location data stream comprises location data corresponding to a physical location of each active mobile device in the plurality of active mobile devices, and wherein the location data is communicated via a first data communication socket in the at least one data communication socket; and receive, at the communication interface, data corresponding to the engagement, the data containing at least an engagement location.

The at least one processor is further configured to execute instructions stored in the non-transitory memory to, in response to determining the engagement location, i) identify at least one nearby active mobile device, wherein the identification comprises evaluating the physical location of each active mobile device in the plurality of active mobile devices relative to the engagement location; ii) transmit, through the communication interface, a first notification regarding the engagement to each of the at least one nearby active mobile device; and iii) receive, at the communication interface, a plurality of first responses responding to the first notification from each of the at least one nearby active mobile device, wherein the first response is communicated via a second data communication socket in the at least one data communication socket.

The at least one processor is further configured to execute instructions stored in the non-transitory memory to, in response to determining that the engagement has been confirmed, i) transmit, through the communication interface, a second notification to each of the at least one nearby active device regarding the confirmed engagement; and ii) receive a plurality of second responses responding to the second notification from each of the at least one nearby active mobile device, wherein the second response is communicated via the second communication socket in the at least one data communication socket; select a selected active user to participate in the confirmed engagement, wherein the selected active user is associated with a selected nearby active mobile device in the at least one nearby active mobile device; and transmit, through the communication interface, a third notification to the selected nearby active mobile device and the at least one nearby active mobile device that is not the selected nearby active mobile device regarding the selection result.

The embodiments described herein provide in yet another aspect, a system for establishing an engagement between a client and an active agent, the system comprising a communication network; a plurality of client devices, each client device configured to communicate client information to a messaging system over the communication network; a plurality of active mobile devices, each active mobile device configured to communicate with the messaging system over the communication network; and a messaging system for communicating an engagement to the plurality of active mobile devices over the communication network, wherein each active mobile device is associated with an active user, the messaging system comprising a communication interface; a non-transitory memory; at least one computer processor, wherein the at least one computer processor is configured to execute instructions stored on the non-transitory memory to establish, at the communication interface, at least one data communication socket for each active mobile device in the plurality of active mobile devices; receive, at the communication interface, a plurality of location data streams, wherein each location data stream comprises location data corresponding to a physical location of each active mobile device in the plurality of active mobile devices, and wherein the location data is communicated via a first data communication socket in the at least one data communication socket; and receive, at the communication interface, data corresponding to the engagement, the data containing at least an engagement location.

The at least one processor of the messaging system is further configured to execute instructions stored in the non-transitory memory to, in response to determining the engagement location, i) identify at least one nearby active mobile device, wherein the identification comprises evaluating the physical location of each active mobile device in the plurality of active mobile devices relative to the engagement location; ii) transmit, through the communication interface, a first notification regarding the engagement to each of the at least one nearby active mobile device; and iii) receive, at the communication interface, a plurality of first responses responding to the first notification from each of the at least one nearby active mobile device, wherein the first response is communicated via a second data communication socket in the at least one data communication socket.

The at least one processor of the messaging system is further configured to execute instructions stored in the non-transitory memory to, in response to determining that the engagement has been confirmed, i) transmit, through the communication interface, a second notification to each of the at least one nearby active device regarding the confirmed engagement; and ii) receive a plurality of second responses responding to the second notification from each of the at least one nearby active mobile device, wherein the second response is communicated via the second communication socket in the at least one data communication socket; select a selected active user to participate in the confirmed engagement, wherein the selected active user is associated with a selected nearby active mobile device in the at least one nearby active mobile device; and transmit, through the communication interface, a third notification to the selected nearby active mobile device and the at least one nearby active mobile device that is not the selected nearby active mobile device regarding the selection result. Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
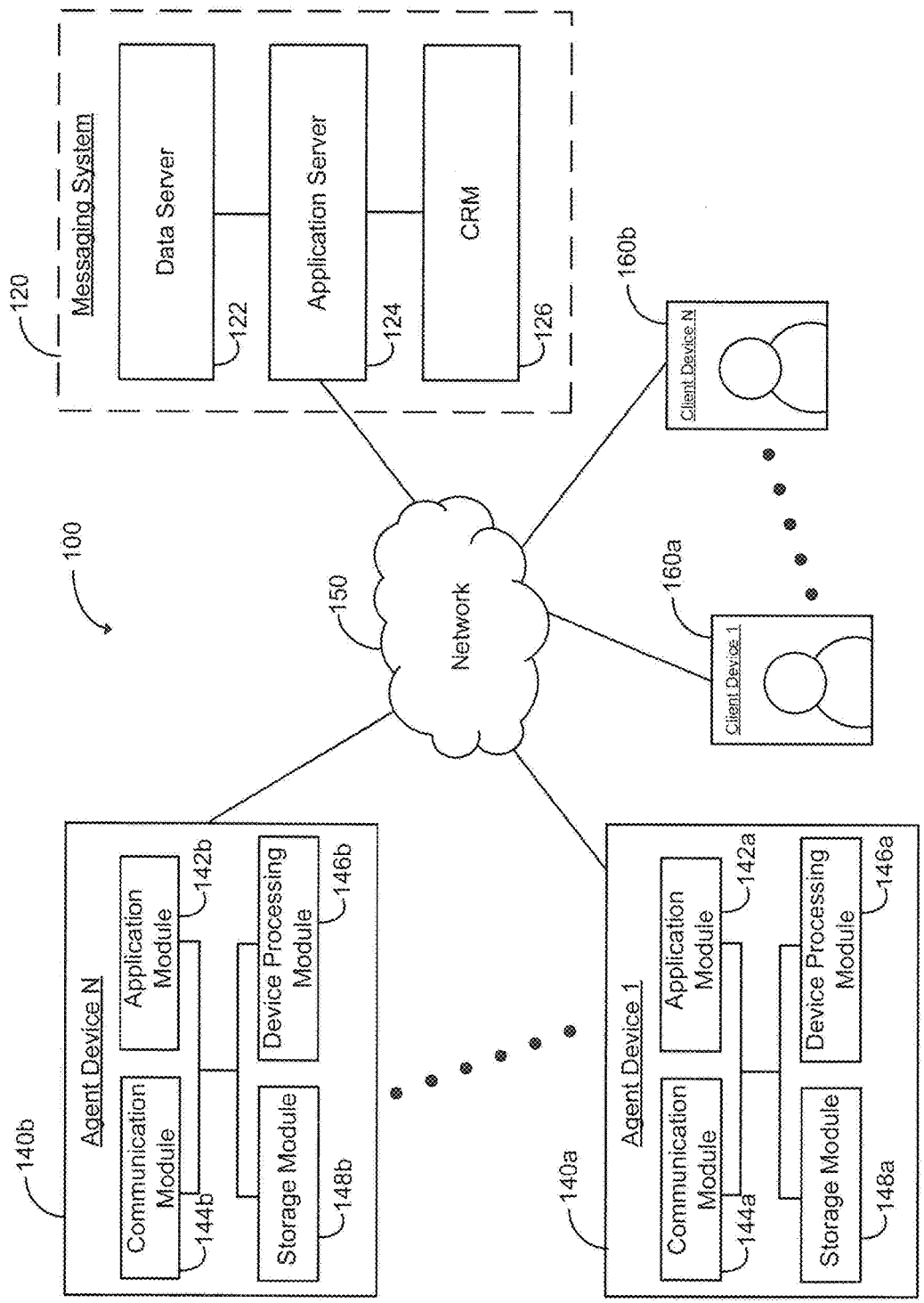
FIG. 1 is a block diagram of an exemplary embodiment of a messaging system used for communication with agent devices and client devices.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor module (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium can be provided in various forms, including one or more diskettes, compact disks, tapes, chips, wireline transmissions, satellite transmissions, internet transmission or downloadings, magnetic and electronic storage media, digital and analog signals, and the like. The computer useable instructions can also be in various forms, including compiled and non-compiled code.

It will be appreciated that for simplicity and clarity of illustration, where considered appropriate, reference numerals can be repeated among the figures to indicate corresponding or analogous elements.

The various embodiments described herein generally relate to methods and systems for timely communication of information related to an engagement to users of mobile devices over a communication medium such as a communication network. The mobile device users may be dispersed across a geographic region, for example, in different areas across a city, state or province, or even across national borders.

For the purposes of this disclosure, an engagement may constitute a face-to-face meeting or appointment between two parties, an agent and a client, in which the purpose of the meeting may be for, but not limited to, the provision of a service, sharing of information, purchase/sale of a product or evaluation/estimation of potential fees for the provision of a service (e.g. an agent may review photos of a plumbing issue taken by the client to estimate potential fees before heading out to service the problem on-site). For the remainder of this disclosure, the terms "client" and "agent" may be used to refer to the party requesting the service or information, and the party providing the service or information, respectively. For example, the agent may be a representative of an insurance broker and the client may be a consumer interested in purchasing insurance coverage. An engagement may thus be a face-to-face discussion between the insurance agent and the client to discuss the various types of insurance policies that may be available. For the client, the discussion may result in the agent selling the client one or more insurance products, or alternatively, the client obtaining useful information for additional analysis and decision making. In other cases, the engagement may be the provision of a service, so that the agent may be a service provider such as a plumber, locksmith, electrician or contractor.

Generally, a client seeking services or product information may be required to locate an agent through directories such as the local YellowPages® directory, local classifieds or through an Internet query. Having identified a number of agents based on the information available, the client may then be required to contact the agent to make an inquiry. Sometimes, the first agent that the client contacts may be busy. At other times, the agent contacted may not be qualified to provide the information or services desired. In yet other times, the client may require several rounds of correspondence, for example, by email or phone calls to arrange an engagement. The process may further be delayed if the email system of the client or the agent has erroneously redirected correspondence into the "spam" or "junk" folder of the email inbox received from agent or the client, respectively. In other words the client may be required to make several inquiries before an appropriate agent is located. Furthermore even when an agent is located and an engagement has been set up, the date and time of engagement may not be for a number of hours or even a number of days, depending on the agent's availability. As such, a significant amount of time may be spent on seeking out assistance with respect to the product and services of interest to the client.

With respect to client-agent engagements, it is generally desirable, from a client's perspective, to obtain the services of an agent as soon as possible, particularly if the matter is urgent (e.g. a flooded basement). From the agent's perspective, meeting with a client earlier on or participating in the decision making process at the early stages, especially if the engagement involves the sale of products, may increase the likelihood of a successful transaction. With this in mind, an agent's mobile communication device may be used to facilitate the establishment of an engagement between an agent and a client in a more timely and efficient manner. As discussed in greater detail below, geo-location technologies coupled with low-latency communication may be used to distribute leads to the one or more agents near a client via their mobile communication devices regarding possible client engagement. The agents may then respond to the lead via their mobile devices if they are interested in pursuing the engagement. As will be apparent in the discussion below, distribution of leads in this manner may significantly reduce the time between an initial client inquiry and an actual face-to-face meeting between an agent and a client.

For the purpose of this disclosure and to enhance understanding of the various embodiments, the examples provided will be given in the context of a client seeking to purchase insurance through an insurance broker. However, it would be understood that the use of an insurance broker is by example only and is not intended to limit the applications of the inventive concept in any way.

Referring now to FIG. 1, shown therein is a block diagram 100 illustrating an exemplary embodiment of agent devices 140*a* and 140*b* and client devices 160*a* and 160*b* in communication with a messaging system 120 for establishing client-agent engagements. As illustrated in FIG. 1, a plurality of agent devices 140*a* and 140*b* (e.g. representing n devices, agent device 1 140*a* through agent device N 140*b*), client device 160*a* and 160*b* (e.g. representing n devices, client device 1 160*a* through client device N 160*b*) are in communication with messaging system 120 over a communication network 150. For ease of exposition, one of the agent devices 140*a* and 140*b* and one of the client devices 160*a* and 160*b* is described. However, it will be understood that one or more of such devices can communicate with the messaging system 120 and/or with other devices over the communication network 150 at any given time. It will be further understood that, for the present disclosure, reference to agent device N 140*b* and client device N 160*b* may be used to denote the "$n^{th}$" device in a group of devices of a given type.

Network 150 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling electronic communication between, the messaging system 120, the agent devices 140*a* and 140*b*, and client devices 160*a* and 160*b*.

Messaging system 120 may be operated by an entity such as the insurance broker to receive inquiries from clients and to provide notifications to agents regarding potential engagements. The messaging system 120 may comprise a data server 122, an application server 124 and a CRM (client relationship manager) 126. Client inquiries made to the broker for information regarding insurance products, which will be described in more detail below, may be provided to the CRM 126 so that a record of the interaction may be made. Client information provided to the CRM 126 may then be stored in the data server 122. The application server 124 may be used to coordinate the flow of data provided to the CRM and data server 122. The application server may further be used to coordinate the flow of data and provide communication between agent devices such as agent device N 140*b* and the messaging system 120. In yet other instances, the application server 124 may provide communication between client device N 140*b*, the messaging system 120 and other devices (not shown).

Agent device N 140*b* may be any device capable of sending and receiving data from the communication network 150 to communicate with the messaging system 120 or other devices connected to the communication network 150. In some embodiments, the agent device N 140*b* may comprise an application module 142*b*, communication module 144*b*, device processing module 146*b* and storage module 148*b*. The application module 142*b* may be a software application stored in the storage module 148*b* that is executed by the device processing module 146*b* to provide functionality that facilitates the establishment of client-agent engagements. For example, the application module 142*b* may be configured to receive, via the communication module 144*b* notifications from the messaging system 120 regarding potential engagements.

The communication module 144*b* may be enabled to operate with various types of communication interfaces, including, but not limited to, serial, parallel, Bluetooth, WiFi, cellular (EDGE, 3G, HSPA, or LTE) and USB, as well as various known protocols including, but not limited to, TCP, UDP, HTTP, HTTPS and UDP. In some embodiments, the storage module 148*b* may further be used to save user specific information such as login-credentials to access the messaging system 120 and the notifications related to potential engagements if the agent using the agent device N 140*b* is unable to immediately review the notification. It would be understood that agent device N 140*b* may be any computing device capable of network communication. For example, and without limitation, agent device N 140*b* can be a personal computer, laptop, personal data assistant, cellular telephone, smart-phone device, tablet computer, and/or wireless device.

In some embodiments, the communication module 144*b* may be further configured to access resources that provide location services and location data, including GPS, Assisted GPS, GLONASS, Cell Tower ID, Wi-Fi positioning system and the like. The ability of the communication module 144*b* to access location services and location data may be useful for active agents that move between engagements from one location to another over time. Location data may be provided to the messaging system 120 on a regular basis to keep the messaging system 120 updated with respect to the whereabouts of those active agents. In return, the messaging system 120 may be in a better position to notify agents who are geographically nearby a client regarding client-agent engagements.

Communication between agent devices 140*a* and 140*b* and the messaging system 120 may be established using various methods known to those skilled in the art. However, with respect to setting up client-agent engagements in a timely fashion, it may be desirable to establish a low latency communication link with geographically dispersed agent devices 140*a* and 140*b*. In some embodiments, communication channels established using WebSocket ("WS") communication over a standard TCP/IP connection may be preferable. The WS protocol, which is defined within the HTML5 specification, may be used to provide a full-duplex, bi-directional communication channel over a conventional HTTP connection via an upgrade protocol between an HTML5-compliant application (i.e. software client) and an HTML5-compliant server. To enhance security, the WS communication channel may be encrypted using methods known to those skilled in the art.

Once a WS channel is established, data frames (text or binary) may be sent back and forth between the application and server in full-duplex mode. As such, in some embodiments, for example, location data may be streamed continuously from agent device N 140*b* to messaging system 120 using a first WS channel and other types of data may be transmitted between the messaging system 120 and agent device N 140*b* using a second WS channel.

Client device N 160*b* may be used by a client to interact with the insurance broker via the messaging system 120. Similar to the agent device N 140*b*, client device N 160*b* may also be any computing device capable of network communication. For example, a client may be using his or her smart phone, tablet or personal computer to perform research with respect to a particular type of insurance product. The research may involve a query of one or more Internet search engines provided by companies such as Google™, Yahoo!™ or Microsoft™. The search results may include a link directing the client to a webpage operated by the broker designed to provide information related to insurance products and services offered by that broker. In some cases, the webpage may be linked to the application server 124 or CRM 126 and includes a user input form to collect information from the client to assist the client with choosing a suitable product. In other cases, the webpage may provide a phone number for the client to call a call center representative who may provide information to the client and set up an appointment with a more knowledgeable insurance agent for a face-to-face meeting (e.g. an engagement). In other cases, the webpage interface may provide an interface for the client to set up an appointment with an insurance agent on a self-directed basis. In yet other cases, the call center agent may be able to facilitate voice communication directly between a client and an available agent through the agent's device through the messaging system 120.

Figure 2A:
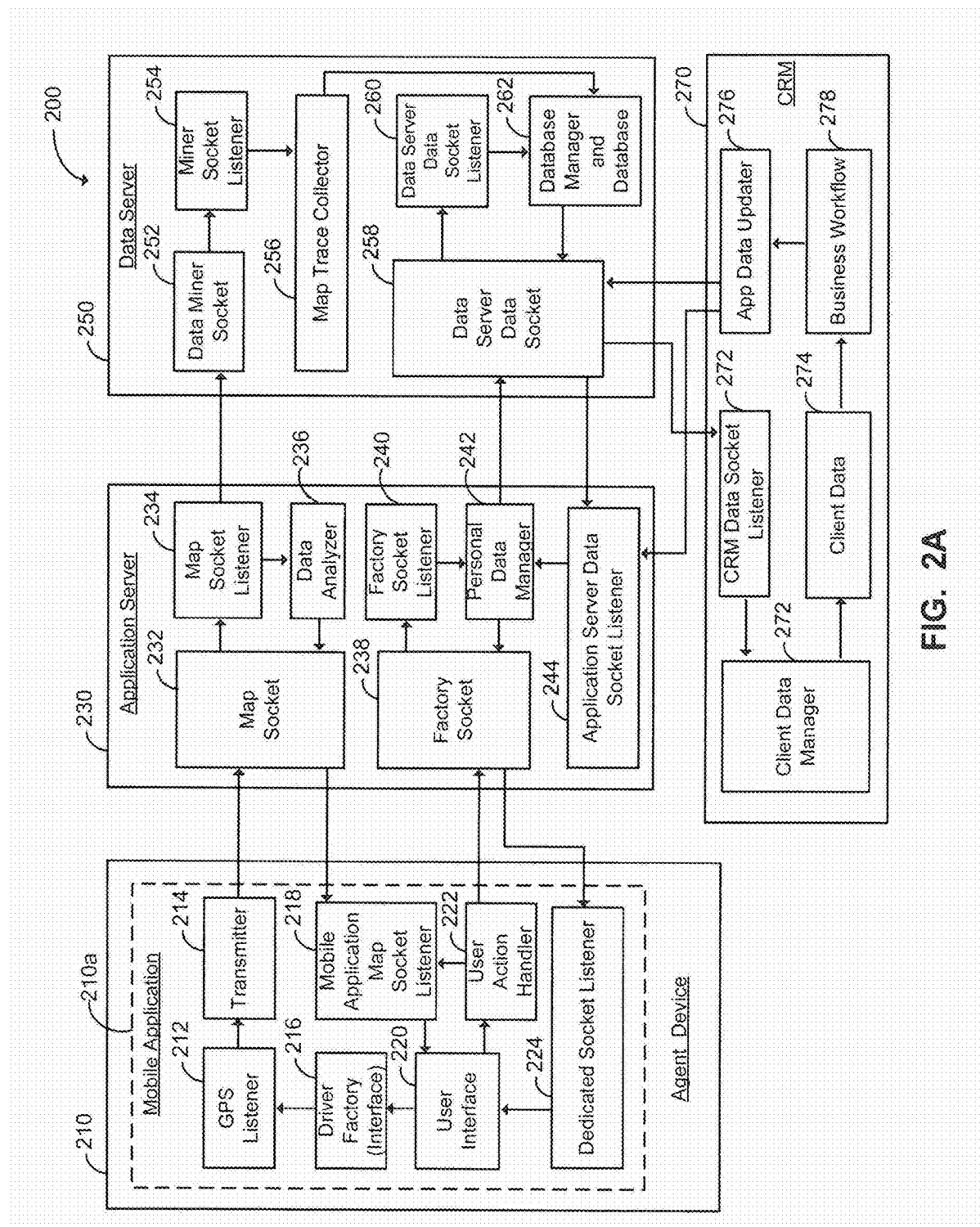
FIG. 2A is a block diagram illustrating the data flow within the messaging system of FIG. 1.

Referring now to FIG. 2A, shown therein is a block diagram 200 of an exemplary embodiment illustrating the data flow between system components of the messaging system 120 of FIG. 1, comprising the application server 230, data server 250 and CRM 270, and an agent device 210. Specifically, the block diagram 200 of FIG. 2 shows the flow of data between the application server 230 and the agent device 210, data server 250 and the CRM 270 to facilitate establishment of agent-client engagements that will be described in further detail below.

In the present embodiment, the application server 230 may be configured to process all data received from the agent device 210 and CRM 270. For example, the data that is processed may include authentication and location data provided by the agent device 210 and data relating to a client collected by the CRM 270. The application server 230 may further be configured to communicate leads regarding potential engagements to the appropriate agents. Specifically the application server 230 may be used to execute the decision making or business logic needed to establish an engagement. The specific components of the agent device 210, application server 230, data server 250 and CRM 270 will be described in further detail below.

The agent device 210 may be representative of an agent's mobile device. As described above, the agent device 210 may be, without limitation, a personal data assistant, cellular telephone, smart-phone device, tablet computer, and/or Wireless device. The agent device 210 may operate a known device operating system or platform such as Android™, Windows™ Phone, or iOS™ to execute mobile application 210a to enable communication with the application server 230 and to provide the mobile application 210a access to hardware resources (not shown) via the driver factory 216.

The mobile application 210a may determine the location of the agent device 210 with the GPS listener 212. The GPS listener 212 may have access to the position detection hardware (not shown) of the mobile device 210 to obtain location and other physical data that may subsequently be transmitted to the application server 230 using transmitter 214. It would be appreciated that the transmitter 214 may be a software module of the mobile application 210a, which makes use of the agent device's hardware resources to establish a WS link to communicate with the application server 230. In some embodiments, the transmitter 214 may make use of a dedicated WS link to transmit position information to the application server.

Figure 2B:
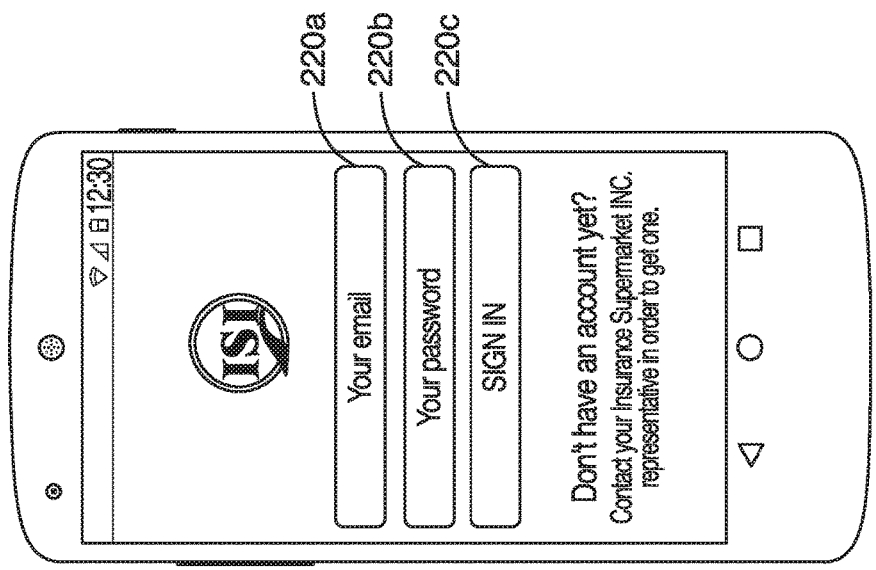
FIG. 2B is a screen shot of a user interface of the agent device of FIG. 2A.

The mobile application 210a may further provide a user interface 220 for displaying information received from the application server 230 and receiving user input. For example, location or map data concerning the location of an engagement may be received via a WS channel by the map socket listener 218 and rendered on the user interface 220. Other information not related to mapping data may be received via another WS channel by the dedicated socket listener 224 and similarly presented on the user interface. The user action handler 222 may be used to receive user input from the user interface 220. For example, as shown in FIG. 2B, when an agent authenticates with the application server 230, the login information of the agent may be requested by the mobile application 210a by presenting, on the user interface 220, a login input field 220a and a password input field 220b. The user action handler 222 may process the login and password information and provide that information to the application server 230 for authentication upon determining that a submission button 220c (e.g. labeled "SIGN IN") rendered on the user interface 220 has been pressed. Once the agent has logged in, the application server 230 may then consider that agent an active agent, and the associated agent device 210 as an active agent device.

The application server 230 in the present embodiment may be used to provide the decision-making functions of the messaging system 120 for establishing client-agent engagements. The application server software may be implemented on any appropriate server environment such as, but not limited to, Microsoft Windows Server™ or any variant of the Linux™ operating system such as Ubuntu™, FreeBSD™ and CentOS™. In some embodiments, the mobile application 210a may communicate only with the application server 230 via established WS channels. As such the mobile application 210a may not have direct access to the data server 250. It may be understood that in such an arrangement, the application server 230 may obtain any data requested by the mobile application 210a from the data server 250 on behalf of the mobile application 210a. In some cases however, the mobile application 210a may have direct access to the data server 250 such that the application server 230 is not needed to retrieve data on the mobile application's 210a behalf.

In some embodiments, the application server 230 may receive location data streams by the map socket listener 234. The location data may be transmitted by the transmitter 214 of the mobile application 201a through a dedicated WS channel designated as the map socket 232. The location data streams received may comprise location data corresponding to the physical location of the agent device 210 gathered by the GPS listener 212. In some cases, the location data stream may also include time stamps that accompany the location data. The frequency of location data transmission may be a fixed time interval (e.g. every 60 seconds) or at the discretion of the mobile application 201a. For example, if the mobile application 201a detects that the agent device 210 is in motion (i.e. the agent is driving his or her car) the rate of data transfer may be increased. In some embodiments if it is determined that the agent device is in motion at a rate corresponding to a driving speeds (e.g. where the speed is greater than 20 km/h) the frequency of transmission of location data may be increased to once every 5 seconds. Where it is determined that the agent device is in motion but the speed of motion corresponds to walking speeds (e.g. where the speed is around 5 km/h) the frequency of transmission of location data may be increased to once every 15 seconds. Where it is determined that the agent device is experiencing little to no movement, the frequency of transmission of location data may be increased to once every 60 seconds. In some other embodiments, detection of motion may be accomplished by determining the mode of communication being used by the agent device. For example where it is determined that the device has switched from long-range wireless communication (e.g. cellular, 3G, LTE and the like) to short range communication (e.g. Wi-Fi communication), the mobile application 210a may trigger an update of the location data. It may therefore be appreciated that modification of the frequency of transmission has a number of benefits, in particular, more efficient use of the agent device's battery and system resources (e.g. processing, memory etc.), reduced congestion of the communication network 150, and reduced processing burden on the application server 230 (i.e. the server may have fewer activities).

In another example, the frequency of location data transmission may be decreased if the mobile application 210a detects that the battery of the agent device 210 is below a set threshold. In some cases, the frequency of location data transmission may be negotiated at the time the agent authenticates with the application server 230. The location data of the agent device 210 may be sent to the data server 250 by the map socket listener 234 for storage. In some embodiments, the most recent location data received by the application server 230 (and stored in data server 250) may be designated as "current" for a specified amount of time (e.g. 90 minutes) so that an agent may still be notified of possible engagements nearby even if he or she appears offline. For example the agent device 210 is temporarily disconnected from the application server 230, which may be the case if the agent device 210 is underground or in an area with weak or no mobile network connectivity.

The map socket 232 may further be used to transmit mapping data produced by the data analyzer 236 to the mobile application 210*a*. For example, when a particular agent is selected to attend an engagement, as described in more detail below, the data related to the location of the face-to-face engagement may be sent by the data analyzer 236 via the map socket 232 of the application server 230 to the map socket listener 218 of the mobile application 210*a*. The mapping data may subsequently be rendered by the user interface 220 for display to the agent.

In some embodiments, application server 230 may also communicate with the agent device 210 through another dedicated WS channel designated as the factory socket 238. Specifically, the factory socket 238 may be used to send and receive data that is unrelated to mapping or location data. For example, in some cases, user inputs obtained from the user action handler 222 of the mobile application 210*a* may be transmitted by the user action handler 222 to the factory socket listener 240 via factory socket 238. Data to be provided to the mobile application 210*a* may be sent by the personal data manager 242 via the factory socket 238 to the dedicated socket listener 224 of the mobile application 210*a*. In some embodiments, the data obtained by the personal data manager 242 may be obtained from the data server 250 through the application server data socket listener 244.

It may be understood that while FIG. 2 illustrates one map socket and one factory socket, the number of sockets established by the application server 230 may increase with the number of active agent devices 210 in communication with the application server 230. For example the number of location data streams increases with more active agent devices 210 so that more instances of map sockets may be needed. Similarly, more instances of factory sockets may be required to transmit data that is unrelated to location data.

The data server 250 may be used to maintain and store all the information needed to operate the messaging system 120. In some embodiments, the data server 250 may be used to store data related to clients (e.g. leads indicating the type of insurance product desired, their location, profile information), engagements, records of prior interactions (e.g. calls and engagements), location data received from the agent devices, and agent or user login information.

In the present embodiment, the data server 250 may be in communication with the application server through dedicated WS channels. It may be appreciated that the use of WS channels to provide rapid and low-latency socket connections may reduce operational time related to requesting/receiving information such as business or client information. Location data originating from agent device 210 may be received from the application server 230 by the miner socket listener 254 through the data miner socket 252. The location data may be processed by the map trace collector 256 so that the data may be saved into the database manager and database 262. In the present embodiment, the data may be "mined" or processed to calculate distances between a client and an agent, as well as to determine the movement patterns of agents for the purpose of selecting an agent to participate in an engagement, the selection process being described in further detail below.

Data unrelated to location data may be received from the application server 230 and processed by the data server data socket listener 260 via the data server data socket 258 and saved to the database manager and database 262. Data to be transmitted to the application server 230 may be sent by the database manager and database 262 through the data server data socket 258. For example, the application server 230 may provide the data server 250 with a read request to retrieve information related to an upcoming engagement and distribute this data to the agent chosen to participate in that engagement. Data for the engagement, for example, may be provided to the application server 230 via the data server data socket 258.

It would be understood that the data server 250 may be implemented in any manner known to those skilled in the art. For example, in some embodiments, the data server 250 may be a component of the application server residing in the same physical computer server such that direct access to the data server 250 may be possible. In other embodiments the data server 250 may operate as a dedicated server within the same data center as the application server 230. In some other embodiments, the data server 250 may operate remotely from the application server 230 so that the application server 230 may be required to operate in application module to permit the data stored on the data server 250 to appear as a local network resource. In yet other embodiments, the data server may be implemented using cloud storage technologies in which access to the stored data may be facilitated via calls to an Application Programming Interface (API) specific for the cloud storage resource.

The customer relationship manager or CRM 270 may be used for tracking client interactions by the insurance broker and for performing tasks such as data collection related to existing and potential clients, client data analysis and analytics, report generation and generation of potential leads for engagements. The CRM 270 may be operated with the application server 230 to provide a system to automate sales, marketing and customer support. For example, in the present embodiment, client information collected through the CRM may be processed by the client data manager 272 to generate client data 274 in accordance to procedures defined in the business workflow 278 and passed onto the application server 230 via the app data updater 276. The CRM may also provide or push information corresponding to possible leads for potential engagements to the application server 230 for dissemination to the agent devices 210.

Communication between the CRM 270 and the application server 230 may be established using WS channels for bidirectional and low-latency connections in a manner as described above. For example, in the present embodiment, the app data updater 276 may transmit client data to the application server 230 through the application server data socket listener 244. The CRM 270 may retrieve data stored in the data server 250 for processing or presentation via the application server 230. For example, the app data updater 276 may issue a data request to the application server 230, the request may be received by the personal data manager 242 (via the application server data socket listener 244) which instructs the database manager and database 262 (via the data server data socket 258 and data server data socket listener 260) to provide the requested data to the CRM 270, received by the data socket listener 272 via the data server data socket 258.

The CRM 270 may provide a number of interfaces specific to different classes of users for the collection of client information. For example, the CRM 270 may provide a call center interface which allows call center agents to enter client information as the call center agent speaks to a client on the phone. Such an interface may be configured for internal use, and may be accessible within the insurance broker's call center via internal network access. In some cases, the call center interface of CRM 270 may be provided using a web-accessible interface such that any compatible web-browser may be used to access the CRM. In other cases, the CRM interface may be application-based which uses a specific executable program to access the CRM 270. However, regardless of the method in which the CRM 270 may be accessed by the call center agent, it may be understood that leads for potential engagements may be generated based on the information entered into the CRM 270 by the call center agents during a call with a client. For example, the lead information may be generated and sent to nearby agents (i.e. as a notification or alert) as soon as sufficient information is collected by the call center agent (e.g. the client's location or address), even while a call center agent is still on the phone with the client.

The CRM 270 may also provide an external interface such as a publicly accessible web landing page or a homepage with content related to insurance products. For example, a consumer searching for insurance products may land on the landing page provided by the CRM 270. In some embodiments, the publicly accessible webpage may be linked to the CRM through a secure communication channel to ensure data exchanged between the visitor and the CRM is secure. The CRM 270 may also feature a quote estimator function to allow a visitor to determine the possible premiums for a particular type of insurance coverage based on information provided by the visitor (now a potential client). As such, the public interface of the CRM 270 may be configured to accept client input through an input form. The input form may include requests for information such as gender, age, known current medical conditions and current medications. In some instances, the input form may further ask the client for their contact information so that a call center representative may follow up with their query. In yet other instances, as will be described in more detail below, the visitor may set up an appointment on a self-directed basis with an agent to further discuss insurance options in a face-to-face meeting.

Figure 3:
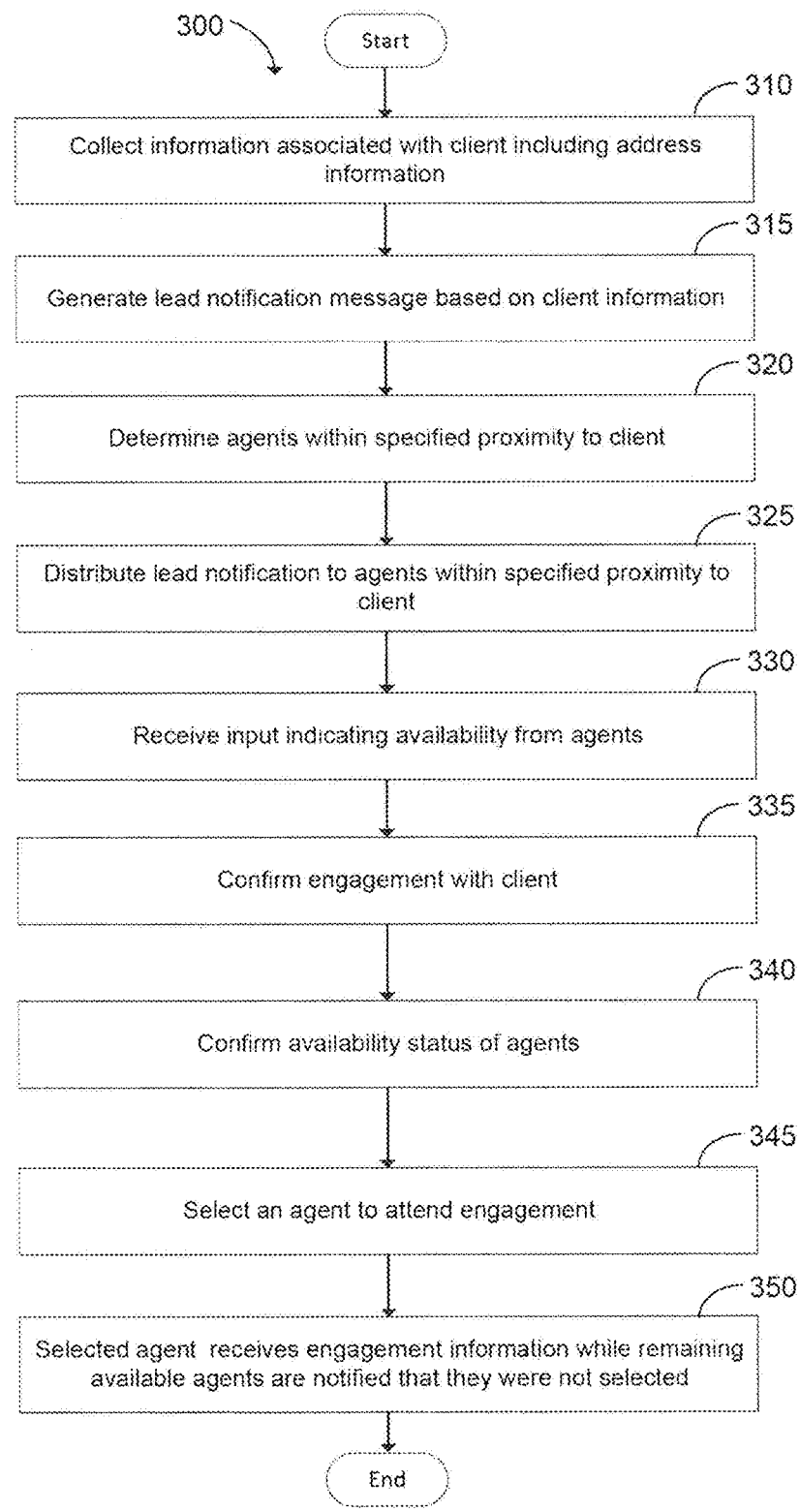
FIG. 3 is a flowchart illustrating the steps to establish a client-agent engagement within the messaging system of FIG. 1.

FIG. 3 is a flowchart 300 of an exemplary embodiment illustrating the method steps that may be performed to establish a client-agent engagement. To illustrate the example method, reference will be made simultaneously to FIG. 2, which illustrates data flows between the various system components, and FIGS. 4A-4E, which illustrate example interfaces presented to an agent via the agent device 210. In some embodiments, the process shown in flowchart 300 may be performed by the application server 230. In other embodiments, different system components may operate cooperatively with each other to execute different steps of the flow chart 300 to complete the overall task.

At step 310, information regarding a client, including address information, may be collected. As discussed above, the client may be in contact with the insurance broker in a number of ways. For example, the client may call the broker's call center to speak with a call center agent. In other cases, the call center agent may initiate a follow up call having received contact information via the front facing portion of the CRM 270, for example, via an input form for requesting insurance quotes. In yet other cases, the information may be collected directly by the CRM 270 via an online form without involving the call center call center.

The information collected may include the client's age, gender, the type of insurance the client is looking for as well as their address information. The collected information may then be used to generate leads upon which engagements between an insurance agent and the client can be arranged. Specifically, in the present embodiment, having obtained the address information and the insurance product of interest, the CRM 270 may provide this lead information to the application server 230 for further processing.

At step 315, the application server 230 may generate a lead notification message based on the client information received from the CRM 270. In particular, a lead notification message may be generated for distribution as soon as the location of the client is determined and provided to the application server 230. However, it may be understood that, in some cases, the CRM 270 may also be capable of generating the lead notification message itself. In the latter arrangement, the lead notification message, rather than the lead information is provided to the application server 230 for distribution.

At step 320 when the lead notification message is ready to be distributed, the application server 230 may proceed to determine one or more active agent devices (i.e. an agent who may be available to participate in an engagement) near the location of the client. Nearby agents may be determined based on the location information transmitted by their associated agent devices to the application server 230.

Whether an active agent device is considered "nearby" may be determined based on the location data collected from that active agent's device by the application server 230. As described above, each active agent device transmits a location data stream via a WS channel to the data server 230 so that the location data may be used to identify the proximity between the active agent and the client. The insurance broker may define distances separating an agent and a client that may be considered a "nearby". For example, distances may relate to travel time or actual distance. In some cases, proximity may be defined using shapes. For example, a square in which the location of the client is the square's center may be defined so that active agents whose current location falling within the square may be considered a nearby agent. The size of the square may be varied depending on the location of the client. For example, a smaller square may be defined in densely populated or urban areas, while a larger square may be used for less populated or rural areas. In other cases the area considered may be defined by other shapes that may be more preferable such as a circle or rectangle.

As discussed previously, the current locations of the active agents may be retained in the data server 250 for a defined period of time (e.g. for 90 minutes) before it is no longer regarded as "current". Therefore, in some cases, even if the active agent has physically moved beyond the designated area (i.e. the square discussed above) but has not provided the application server 230 with its new location, that agent may still be regarded as a nearby agent.

At step 325, having identified one or more nearby agents, lead notification messages may be distributed to these nearby agents. The lead notification message may include a unique recipient identifier, information corresponding to the type of insurance the client is looking for and the approximate distance. It may be preferable to distribute the lead notification messages to the nearby agents in a manner that each of the nearby agents can receive their notification message concurrently or as close to concurrent reception (i.e. all of the recipients receiving the notifications at substantially the same time, with minimal delay between each recipients receiving their respective notification) as possible. Concurrent reception may be used to distribute lead notification messages in a manner that no specific recipient would have an advantage over another recipient with respect to receiving lead data. It may be appreciated that achieving concurrent reception may help improve sales and customer satisfaction. For example, the recipients of the notifications may be high-performing as well as average- or low-performing agents. If a less experienced or low-performing agent is notified first and responds first, that agent may end up being selected to participate in an engagement over a more experienced or higher-performing agent because there was a delay in the latter agent receiving a notification. The likelihood of a successful sale may be reduced as a result of the low-performing agent's experience level.

In some embodiments, the application server 230 may execute or spawn multiple system processes for the purpose of generating and distributing lead notification messages to facilitate concurrent reception. For example, the number of processes spawned may be equal to the number of nearby agents set to receive the lead notification messages. In doing so, each process may be responsible for distributing one lead notification message to minimize processing delays. In some embodiments, the distribution of lead notification messages may utilize a dedicated lead notification distribution system (not shown) to distribute the lead notification messages. This dedicated system may be optimized to communicate with the agent devices in a way that maximizes the likelihood of concurrent reception. For example, the dedicated lead notification system may be operated by a third party provider with capabilities and infrastructure to facilitate cross-platform (e.g. iOS and Android) concurrent delivery.

The application server 230 may spawn processes to generate the lead notification and access the lead notification system. The methods of access may be implemented using methods known to those skilled in the art, such as using web-based API calls to schedule the notifications. Therefore, in the current example, each process launched by the application server 230 may execute an API call to the lead notification system. The notifications transferred to the lead notification distribution system may be forwarded to the nearby agent devices based on the unique recipient identifier. In other embodiments, a dedicated lead notification system may not be used. For example the message distribution process may make use of an existing WS channel established between a given agent device 210 and the application server 230 to distribute the notification. In other embodiments, the process may send the lead notification using a new WS channel.

Figures 4A, 4B:
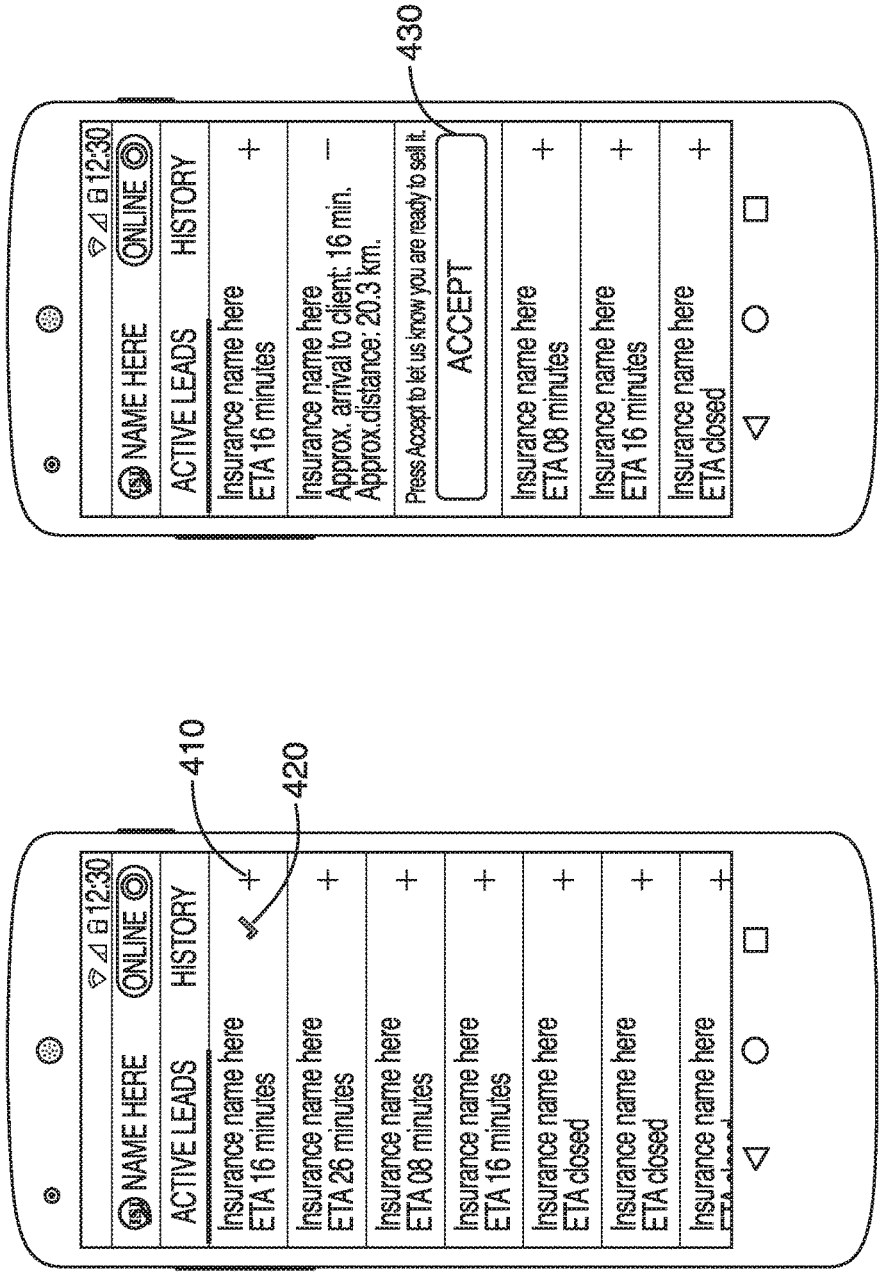
FIGS. 4A-4E are screen shots of an exemplary user interface of the client device of FIG. 2A for various steps described in the flowchart of FIG. 3.

On the active agent's device, the notification may be displayed on the user interface 220 of the agent device 210. For example, as shown in FIG. 4A, the lead notification may appear on the agent's screen indicating the type of insurance a client is looking for as well as the estimated travel time to the client for an engagement. Depending on the location of an agent, that agent may be considered a nearby agent for a number of possible engagements (i.e. that agent falls within several of the squares described above). As such, an agent may receive multiple lead notifications as shown in FIG. 4A. Also shown in FIG. 4A is that the notification may be expanded, by tapping on the "+" symbol 410 on the right side of the lead notification. FIG. 4B shows an expanded lead notification, which provides additional information such as the actual distance to the client's location.

At step 330, the application server 230 may receive a response corresponding to an input by the agent which indicates whether or not the active agent who received the lead notification message is available to participate in an engagement. The agent may respond to the lead notification message by tapping on an input button (not shown) presented on the user interface 220 of the mobile application 210a to indicate that the agent is available to sell the particular insurance product listed in the lead notification message. Tapping the input button may be considered a "vote" from the active agent indicating to the application server 230 that the active agent wishes to be considered for the engagement. Upon tapping on the input button on the user interface 220 of the agent device 210 to vote, the user action handler 222 may process the action and transmit the response to the personal data manager 242 of the application server 230 via the factory socket 238. In circumstances where an active agent is presented with multiple lead notifications, that agent may submit a vote for more than one lead notification.

In some embodiments, the lead notification may remain open for votes and subsequently close (i.e. no longer accept responses) when an engagement has been confirmed with the client. An engagement may be confirmed during an interaction between a call center agent and a client if, for instance, the call center agent informs the client that agents are available to meet the client within the next 60 minutes and the client agrees to meet an agent for further discussion. The call center agent may then confirm the time of the engagement upon which time the lead may close.

At step 335 confirmation of the engagement may cause the lead notification to close, so that the application server 230 may stop accepting votes for that lead. If an agent did not respond to the lead notification by the time the lead closes, then that particular agent may be deemed not to have voted. In some embodiments, the lead notification may indicate a time limit for providing a response (not shown). If the time to respond has lapsed and the agent did not respond, then that agent may similarly be deemed not to have voted.

Figure 4D:
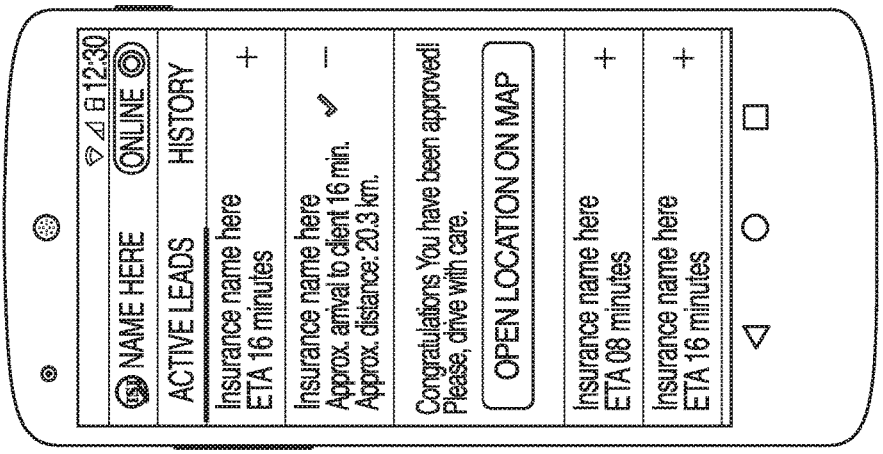
Figure 4C:
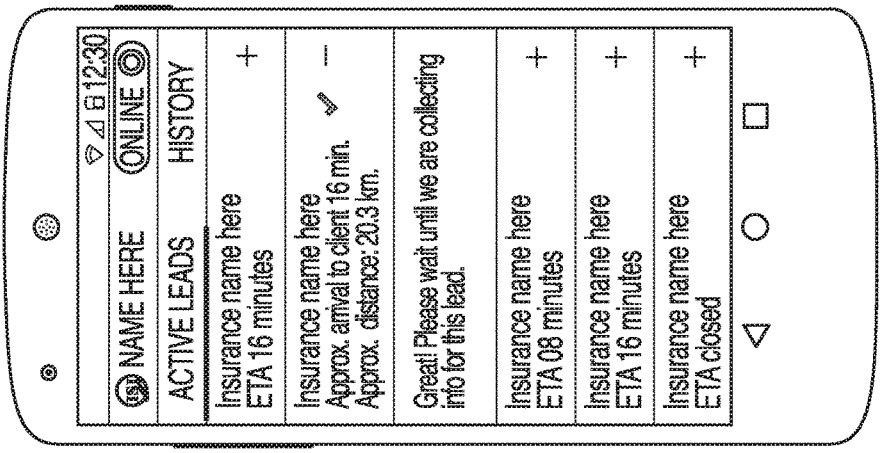

At step 340, when an engagement is confirmed, a notification to confirm the nearby agents' availability may be sent by the application server 230 to all the nearby agents that have previously voted for the lead. The nearby agents that voted may be presented with another input button such as an "Accept" button 430 or a "Decline" button (not shown) on the user interface 220 as shown in FIG. 4B. Clicking or tapping the "Accept" button may be used to indicate to the application server 230 the agent is ready and willing to participate in the engagement if selected to go. Clicking or tapping on the "Decline" button may be used to indicate to the application server that the agent is no longer available for the engagement. The input may be received by the user action handler 222 which then transmits the response to the personal data manager 242 of the application server 230 via the factory socket 238. Upon the agent confirming a lead notification (pressing the "Accept" button 430), the user interface 220 of the mobile application 210a may be updated to indicate to the agent to wait for a confirmation, if any, that the agent has been selected to meet with the client as shown in FIG. 4C. A checkmark 420 may be displayed next to the lead notification to indicate that the lead has been accepted (i.e. available to take the lead), for example, as shown in FIG. 4A. In some embodiments, a time limit may be imposed for which an agent may "Accept" or "Decline" their availability. For example if an agent fails to respond, the application server 230 may deem that agent to have selected "Decline".

As discussed above, the application server 230 may use the confirmations provided by the nearby agents as an indication that the agent is ready, available and committed to attend the engagement if one of those agents were selected to meet with the client. As such no further input to confirm may be required. Accordingly, an agent may only be permitted to confirm availability for one lead at a time, unlike the agent's ability to vote for multiple leads. In other words, once an agent has confirmed his or her availability for a particular lead, the "Accept" buttons corresponding to other leads may be disabled by the user interface 220 of the mobile application 210*a* until an agent has been selected for that lead.

At step 345, a nearby active agent that may be selected to attend the engagement and meet with the client. With respect to the method of selection, the procedure or process may be set by the insurance broker using any desirable selection criteria. For example, each agent may be given a score based on various factors including, but not limited to, feedback from clients on past engagements, the success rate of the agent in securing a sale and expertise in the type of insurance being sold. A ranking of active agents may be produced from which the highest ranked agent may be selected.

At step 350, a nearby active agent may be selected to attend the engagement. Subsequently, a notification specifically for the selected agent may be provided as shown in FIG. 4D, the notification containing details of the engagement, including the time and location. The agents not selected may also be provided a notification indicating that they were not selected for the engagement and may resume voting or confirming their availability for other potential engagements. Data related to the confirmed engagement such as the time and location may be saved to a confirmed engagement list on the data server 250. The confirmed engagement list may also record various parameters related to the engagement for later analysis. For example, for each appointment, information regarding the agent's travel time, duration of the engagement, the agent's arrival time (i.e. whether he/she was late or early), and whether the engagement was an "instant" engagement (e.g. an engagement set up between a client an available agent) or a scheduled engagement (e.g. the client may have a specific agent in mind and has scheduled an engagement ahead of time).

In some embodiments, the application server 230 may request the selected agent to acknowledge that they have been selected prior to receiving details regarding the engagement (i.e. prior to method step 350 being performed). This may be useful in situations where the agent was previously within the defined area deemed nearby the client but has since travelled outside of that defined area. The notification requesting acknowledgement may have a time limit imposed such that upon expiration of that time limit, a second agent in the list of agents that have voted may be selected and notified instead. If the second agent acknowledges being selected, then step 350 may be performed.

Figure 4E:
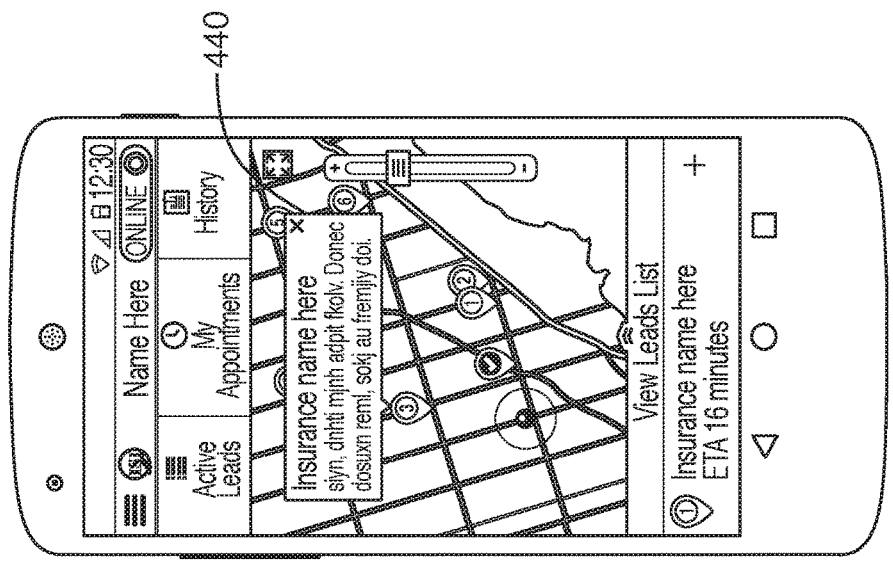

As shown in FIGS. 4D and 4E, the notification sent to the selected agent may also include mapping data that the agent may access by interacting with the user interface 220. The mapping data may be used to plot on a map on the user interface 220 of the agent device 210 to indicate the location of the confirmed engagement including the exact address displayed in a text box 440, as shown in FIG. 4E. In some embodiments, the mobile application 210*a* may be configured to access external information resources for providing enhanced features such as driving directions and traffic data.

Figure 5:
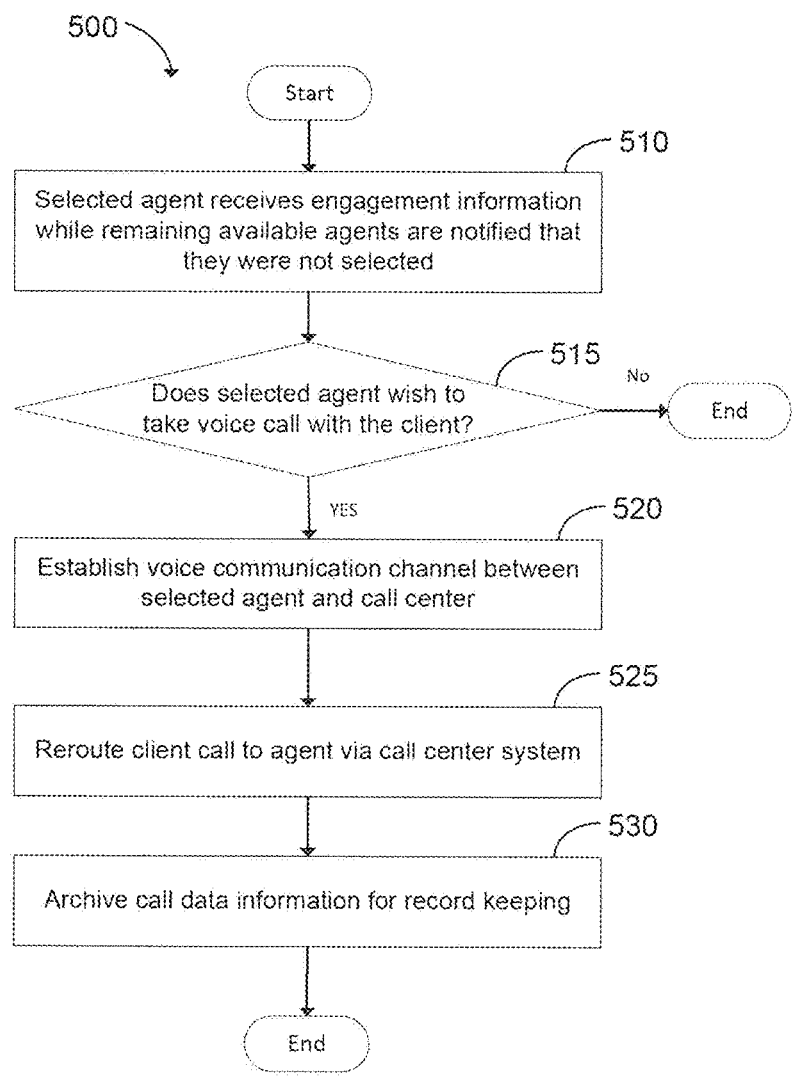
FIG. 5 is a flowchart illustrating the steps to establish voice communication within the messaging system of FIG. 1.

Referring now to FIG. 5, shown therein is a flowchart 500 that illustrates a variation of the process described in FIG. 3. In the present variation, the selected agent may elect to speak with the client directly via mobile application 210*a*. Flowchart 500 may be viewed as a continuation of flowchart 300 since method step 510 may be considered the same or substantially similar to method step 350 of flowchart 300 of FIG. 3. This variation may be useful since direct communication with the client may result in a better client-agent relationship being formed prior to the engagement and would allow the client, if desired, to alter the meeting location to a location that is different from the location information collected by the call center agent. Furthermore, the call center may operate more efficiently since the call center agent may attend to other potential clients waiting to be assisted.

At step 510, similar to step 350 as shown in FIG. 3, a notification specifically for the selected agent may be provided as shown in FIG. 4D. The agents that were not selected may also be provided a notification indicating that they were not selected for the engagement and may resume voting or confirming their availability for other potential engagements. Data related to the confirmed engagement such as the time and location may be saved to a confirmed engagement list on the data server 230.

At decision step 515, the selected agent may choose to speak with the client through the mobile application 210*a*. The user interface 220 may provide the appropriate inputs allowing the agent to submit a call request to the application server 230 to indicate that a call is desired. If the selected agent does not choose to speak with the client, the process ends. The selected agent may proceed to the engagement based on the engagement information provided by the application server 230.

If the selected agent elects to call, the application server 230 may receive the call request at the factory socket listener 240 through the factory socket 238. The request may then be forwarded to the CRM 270 and processed by the client data manager 270. The call center agent may be notified of the call request who may in turn advise the client of the call and connect the selected agent with the client. The application server 230 may reroute the client's voice connection from the call center to the selected agent's mobile application 210*a*. In other words, the interaction is handed off from the call center agent to the selected agent. The remainder of the interaction may bypass the call center.

At step 520, a voice communication channel may be established between the agent and the call center. Voice data may be transmitted using technologies known to those in the art. For example, the application server 230 and mobile application 210*a* may be configured to make use of voice over IP (VoIP) technologies to transmit voice data. For example, the mobile application 210*a* may be compiled with an HTML5 soft phone framework to access one or more Session Initiation Protocol (SIP) trunk connections provided by the application server 230.

At step 525, the call center agent may notify the client on the call to advise the client that the call would be handed off to the agent selected for the engagement. The handoff may be coordinated by the VoIP software integrated into the CRM and application server 230 so that the call between the client and the selected agent may be routed through the application server 230.

At step 530, the call may be archived by the application server 230 for record keeping. While it may be understood that voice calls may be handled using other manners such as using standard telephone connections routed through a traditional telecom provider, it may be preferable to route the call through the application server 230. As noted above, upon the agent engaging in the call, the call center is no longer involved in the interaction. By routing the call through the application server, a record of the call and the interaction may be maintained. In some cases, the conversation may be recorded and a text transcript may be generated for quality assurance.

Figure 7:
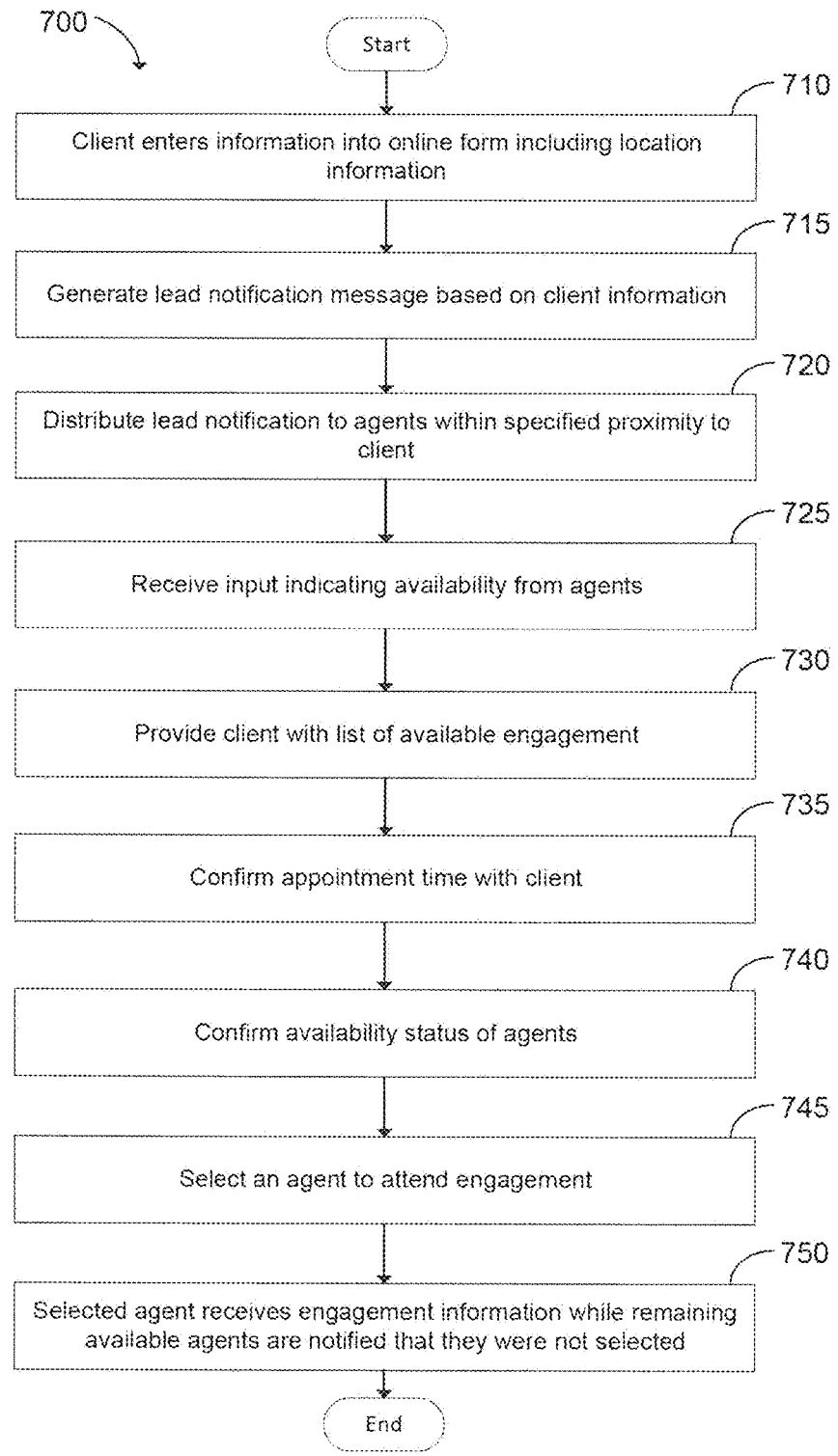
FIG. 7 is a flowchart illustrating the steps for self-directed engagement setting within the messaging system of FIG. 1.

In some embodiments, the client may be able to set up an engagement without the assistance of a call center agent. This process may be referred to as "self-directed" engagement or appointment setting. In other words, the call center may be excluded completely from the interaction. FIG. 7 shows a flow chart 700 that illustrates the steps that may be taken to establish an engagement by a client on a self-directed basis.

Setting up an engagement may be accomplished, for example, where the client is able to interact with the CRM 270 directly. As described above, the CRM 270 also may provide a public interface such as a publicly accessible web landing page or a homepage with content related to insurance products. The landing page may be accessible by anyone with access to the Internet using different types of devices such as mobile phones, desktop computers, laptop computers and the like. This public-facing interface may further be structured to accept input from a website visitor (i.e. client) so as to collect information needed to generate a lead. In other words, the online property may be used instead of operating a call center.

At step 710 a client visiting the landing page may enter information into an online form including address or location information. For example, a landing page website may be structured to provide a quote estimator to allow a client to estimate the insurance premium for a particular type of insurance product.

Figure 6:
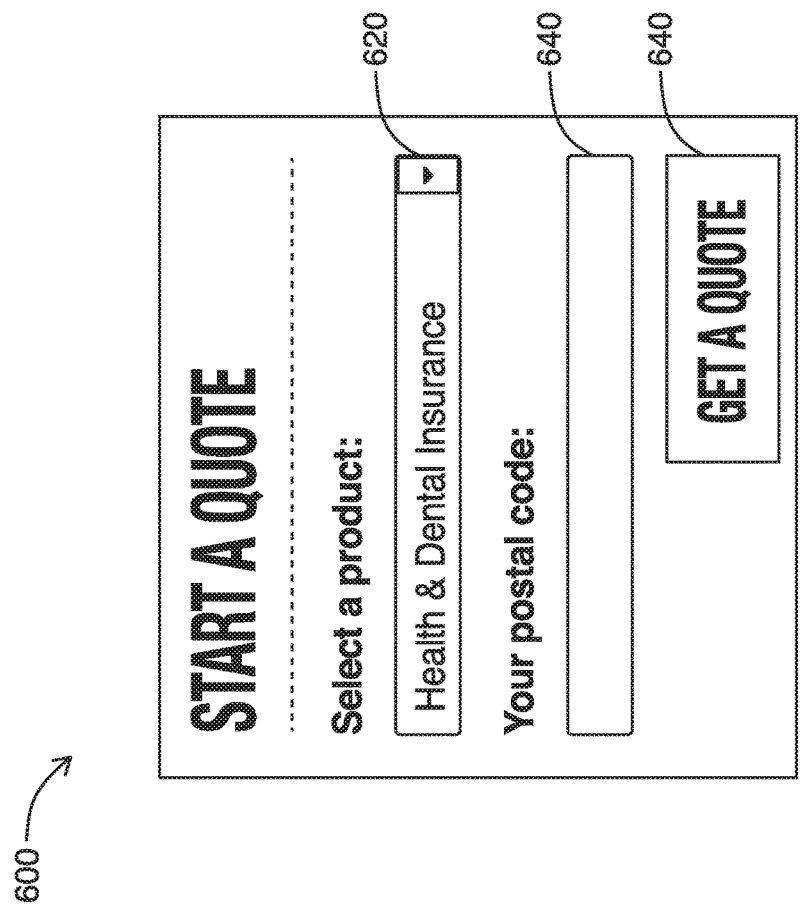
FIG. 6 is an image of a user interface for self-directed engagement setting within the messaging system of FIG. 1.

As shown in FIG. 6, the interface may include a drop-down selector 620 to enable the client to select the type of insurance coverage desired. An input field 640 may be provided to allow the client to input their postal code to indicate their area of residence, since insurance premiums may vary depending on location. By clicking or tapping on the "Get a Quote" button 640, the two pieces of information (type of insurance and location information), may be submitted and processed, for example, by the CRM 270. At this point, sufficient information may be collected to generate a lead notification message for distribution to nearby active agents in accordance with step 715. At step 720, nearby active agents may be identified in a manner similar to step 320 of flowchart 300 of FIG. 3 and the lead notifications may be distributed in a manner similar to step 325 of flowchart 300 of FIG. 3. Responses confirming the availability of nearby agents may be received by the application server 230 at method step 725 in a manner similar to step 330 of flowchart 300 of FIG. 3. Upon receiving agent responses, the application server 230 may indicate to the CRM 270 that agents are available for an engagement with the client. In response, the CRM 270 may alter the presentation of the landing page to indicate to the client that agents are available for a face-to-face engagement.

At method step 730, the web page interface may further be altered to provide one or more engagement times that may be selected by the client. At method step 735, an engagement may be confirmed with the client if the client selects an available time slot. Similar to method steps 340, 345 and 350 of flowchart 300 of FIG. 3, at method steps 740, 745 and 750, the availability of the nearby agents may be confirmed, an agent may be selected for the engagement, and the notifications may be distributed regarding the results of the selection process, respectively.

In some embodiments, features described in flowchart 500 of FIG. 5 may similarly be integrated in the self-directed engagement setting scenario. For example, upon an agent being selected for the engagement, the selected agent may elect to communicate directly with the client. Under this scenario, the client's user interface may be updated by the CRM 270 to indicate to the client whether the client wishes to speak directly with the agent selected for the engagement, prior to meeting in person. If the client agrees to speak with the selected agent, the client may be asked by the CRM 270 to input their telephone number (if not already available) and a phone call may be established. As described previously, this call may be routed through the application server 230 so that a record of the interaction may be made and a text transcript may be generated for quality assurance.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method of communicating an engagement to a plurality of active mobile devices, wherein each active mobile device is associated with an active user, the method comprising:

providing at least one data communication socket for each active mobile device in the plurality of active mobile devices;

receiving a plurality of location data streams, wherein each location data stream comprises location data corresponding to a physical location of each active mobile device in the plurality of active mobile devices, and wherein the location data is communicated via a first data communication socket in the at least one data communication socket;

receiving information corresponding to the engagement, the information containing at least an engagement location;

in response to determining the engagement location
i. identifying at least one nearby active mobile device, wherein the identifying comprises evaluating the physical location of each active mobile device in the plurality of active mobile devices relative to the engagement location;
ii. providing a first notification regarding the engagement to each of the at least one nearby active mobile device; and
iii. receiving a plurality of first responses responding to the first notification from each of the at least one nearby active mobile device, wherein the first response is communicated via a second data communication socket in the at least one data communication socket;

in response to determining that the engagement has been confirmed
i. providing a second notification to each of the at least one nearby active device regarding the confirmed engagement; and
ii. receiving a plurality of second responses responding to the second notification from each of the at least one nearby active mobile device, wherein the second response is communicated via the second communication socket in the at least one data communication socket;

selecting a selected active user to participate in the confirmed engagement, wherein the selected active user is associated with a selected nearby active mobile device in the at least one nearby active mobile device; and providing a third notification to the selected nearby active mobile device and the at least one nearby active mobile device that is not the selected nearby active mobile device regarding the selection result.

2. The method of claim 1, wherein the location data of the active device in the plurality of active mobile devices is updated within a defined time interval, and wherein the evaluating the physical location of each active mobile device comprises determining a most recently updated physical location for each active mobile device and determining that the proximity between the determined engagement location and the most recently updated physical location of that active mobile device is within a set distance.

3. The method of claim 1, wherein selecting the selected active user is based at least on determining and evaluating a performance metric associated with each active user associated with the at least one nearby active mobile device.

4. The method of claim 1 wherein the second data communication socket operates contemporaneously with the first data communication socket.

5. The method of claim 1, wherein at least one of the first notification, second notification and third notification is provided via a communication channel distinct from the plurality of data communication sockets.

6. The method of claim 5, wherein the method further comprises establishing a transmission process for each of the at least one nearby active mobile devices for providing at least one of the first notification, second notification and third notification.

7. The method of claim 1, wherein at least one of the first notification, second notification and third notification is provided via a data communication socket in the plurality of data communication sockets that is separate from the first and second data communication sockets.

8. The method of claim 1, wherein at least one of the first notification, second notification and third notification, when provided, is received by each of the at least one nearby active mobile device at substantially the same time, and wherein at least one of the first notification and second notification provided to each of the at least one nearby active mobile device comprises notification content that is specific for that device.

9. The method of claim 1, wherein the third notification provided to the selected nearby active mobile device contains at least the engagement location and the third notification provided to the at least one nearby active mobile device that is not the selected nearby active mobile device does not contain the engagement location.

10. The method of claim 1, wherein each of the plurality of first responses comprises an availability indicator associated with a corresponding nearby active user indicating the user's availability to participate in the engagement, and each of the plurality of second responses comprises a confirmation indicator associated with the corresponding nearby active user that confirms the user's availability.

11. The method of claim 1, wherein determining the engagement location and an engagement time constitutes the engagement being confirmed.

12. The method of claim 1, the method further comprising:

receiving an input from the selected user via the second data communication socket requesting for audio communication regarding the engagement;

establishing a third data communication socket, the third data communication socket being configured to communicate at least audio data; and saving the audio data communicated in the third data communication socket in an audio data record, the audio data record being associated at least with the engagement.

13. A device for communicating an engagement to a plurality of active mobile devices, wherein each active mobile device is associated with an active user, the system comprising:

a communication interface;

a non-transitory memory;

at least one computer processor, wherein the at least one computer processor is configured to execute instructions stored on the non-transitory memory to:

establish, at the communication interface, at least one data communication socket for each active mobile device in the plurality of active mobile devices;

receive, at the communication interface, a plurality of location data streams, wherein each location data stream comprises location data corresponding to a physical location of each active mobile device in the plurality of active mobile devices, and wherein the location data is communicated via a first data communication socket in the at least one data communication socket;

receive, at the communication interface, data corresponding to the engagement, the data containing at least an engagement location;

in response to determining the engagement location
  i. identify at least one nearby active mobile device, wherein the identification comprises evaluating the physical location of each active mobile device in the plurality of active mobile devices relative to the engagement location;
  ii. transmit, through the communication interface, a first notification regarding the engagement to each of the at least one nearby active mobile device; and
  iii. receive, at the communication interface, a plurality of first responses responding to the first notification from each of the at least one nearby active mobile device, wherein the first response is communicated via a second data communication socket in the at least one data communication socket;

in response to determining that the engagement has been confirmed
  i. transmit, through the communication interface, a second notification to each of the at least one nearby active device regarding the confirmed engagement; and
  ii. receive a plurality of second responses responding to the second notification from each of the at least one nearby active mobile device, wherein the second response is communicated via the second communication socket in the at least one data communication socket;

select a selected active user to participate in the confirmed engagement, wherein the selected active user is associated with a selected nearby active mobile device in the at least one nearby active mobile device; and transmit, through the communication interface, a third notification to the selected nearby active mobile device and the at least one nearby active mobile device that is not the selected nearby active mobile device regarding the selection result.

14. The device of claim 13, wherein the location data of the active device in the plurality of active mobile devices is updated within a defined time interval, and wherein the evaluating the physical location of each active mobile device comprises determining a most recently updated physical location for each active mobile device and determining that the proximity between the determined engagement location and the most recently updated physical location of that active mobile device is within a set distance.

15. The device of claim 13, wherein selecting the selected active user is based at least on determining and evaluating a performance metric associated with each active user associated with the at least one nearby active mobile device.

16. The device of claim 13, wherein the second data communication socket operates contemporaneously with the first data communication socket.

17. The device of claim 13, wherein at least one of the first notification, second notification and third notification is provided via a communication channel distinct from the plurality of data communication sockets.

18. The device of claim 17, wherein the at least one computer processor is further configured to execute instructions stored on the non-transitory memory to launch a transmission process for each of the at least one nearby active mobile devices for providing at least one of the first notification, second notification and third notification.

19. The device of claim 13, wherein at least one of the first notification, second notification and third notification is provided via a data communication socket in the plurality of data communication sockets that is separate from the first and second data communication sockets.

20. The device of claim 13, wherein at least one of the first notification, second notification and third notification, when transmitted, is received by each of the at least one nearby active mobile device at substantially the same time, and wherein at least one of the first notification and second notification transmitted to each of the at least one nearby active mobile device comprises notification content that is specific for that device.

21. The device of claim 13, wherein the third notification transmitted to the selected nearby active mobile device contains at least the engagement location and the third notification transmitted to the at least one nearby active mobile device that is not the selected nearby active mobile device does not contain the engagement location.

22. The device of claim 13, wherein each of the plurality of first responses comprises an availability indicator associated with a corresponding nearby active user indicating the user's availability to participate in the engagement, and each of the plurality of second responses comprises a confirmation indicator associated with the corresponding nearby active user that confirms the user's availability.

23. The device of claim 13, wherein determining the engagement location and an engagement time constitutes the engagement being confirmed.

24. The device of claim 13, wherein the at least one computer processor is further configured to execute instructions stored on the non-transitory memory to:
receive, at the communication interface, an input from the selected user via the second data communication socket requesting for audio communication regarding the engagement;
establish, at the communication interface, a third data communication socket, the third data communication socket being configured to communicate at least audio data; and store the audio data communicated in the third data communication socket in an audio data record in the non-transitory memory, the audio data record being associated at least with the engagement.

25. A system for establishing an engagement between a client and an active agent, the system comprising:
a communication network;
a plurality of client devices, each client device configured to communicate client information to a messaging system over the communication network;
a plurality of active mobile devices, each active mobile device configured to communicate with the messaging system over the communication network; and
a messaging system for communicating an engagement to the plurality of active mobile devices over the communication network, wherein each active mobile device is associated with an active user, the messaging system comprising:
a communication interface;
a non-transitory memory;
at least one computer processor, wherein the at least one computer processor is configured to execute instructions stored on the non-transitory memory to:
establish, at the communication interface, at least one data communication socket for each active mobile device in the plurality of active mobile devices;
receive, at the communication interface, a plurality of location data streams, wherein each location data stream comprises location data corresponding to a physical location of each active mobile device in the plurality of active mobile devices, and wherein the location data is communicated via a first data communication socket in the at least one data communication socket;
receive, at the communication interface, data corresponding to the engagement, the data containing at least an engagement location;
in response to determining the engagement location
  i. identify at least one nearby active mobile device, wherein the identification comprises evaluating the physical location of each active mobile device in the plurality of active mobile devices relative to the engagement location;
  ii. transmit, through the communication interface, a first notification regarding the engagement to each of the at least one nearby active mobile device; and
  iii. receive, at the communication interface, a plurality of first responses responding to the first notification from each of the at least one nearby active mobile device, wherein the first response is communicated via a second data communication socket in the at least one data communication socket;
in response to determining that the engagement has been confirmed
  i. transmit, through the communication interface, a second notification to each of the at least one nearby active device regarding the confirmed engagement; and
  ii. receive a plurality of second responses responding to the second notification from each of the at least one nearby active mobile device, wherein the second response is communicated via the second communication socket in the at least one data communication socket;
select a selected active user to participate in the confirmed engagement, wherein the selected active user is associated with a selected nearby active mobile device in the at least one nearby active mobile device; and transmit, through the communication interface, a third notification to the selected nearby active mobile device and the at least one nearby active mobile device that is not the selected nearby active mobile device regarding the selection result.

\* \* \* \* \*